(12) United States Patent
Lee et al.

(10) Patent No.: US 12,234,112 B2
(45) Date of Patent: Feb. 25, 2025

(54) TAPE ATTACHMENT APPARATUS

(71) Applicant: LG Energy Solution, Ltd., Seoul (KR)

(72) Inventors: Young Soo Lee, Daejeon (KR); Jin Soo Lee, Daejeon (KR); Hong Ju Hwang, Daejeon (KR); Seung Hoo Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 126 days.

(21) Appl. No.: 17/915,030

(22) PCT Filed: Jul. 6, 2021

(86) PCT No.: PCT/KR2021/008604
§ 371 (c)(1),
(2) Date: Sep. 27, 2022

(87) PCT Pub. No.: WO2022/014940
PCT Pub. Date: Jan. 20, 2022

(65) Prior Publication Data
US 2023/0055489 A1 Feb. 23, 2023

(30) Foreign Application Priority Data
Jul. 14, 2020 (KR) .......................... 10-2020-0087018

(51) Int. Cl.
*B65H 19/29* (2006.01)
*B65H 35/00* (2006.01)
(Continued)

(52) U.S. Cl.
CPC ......... *B65H 19/29* (2013.01); *B65H 35/0033* (2013.01); *H01M 4/04* (2013.01);
(Continued)

(58) Field of Classification Search
CPC ................ B65H 19/29; B65H 35/0033; B65H 2301/414422; B65H 2301/414433;
(Continued)

(56) References Cited

U.S. PATENT DOCUMENTS

| 4,351,687 A | 9/1982 | Lesage |
| 2002/0189746 A1 | 12/2002 | Kuta et al. |
| 2020/0227710 A1 | 7/2020 | Shinomiya et al. |

FOREIGN PATENT DOCUMENTS

| CN | 111332847 A | 6/2020 |
| DE | 102014118908 A1 | 6/2016 |

(Continued)

OTHER PUBLICATIONS

International Search Report for Application No. PCT/KR2021/008604 mailed Oct. 8, 2021, 2 pages.
(Continued)

*Primary Examiner* — George R Koch
(74) *Attorney, Agent, or Firm* — Lerner David LLP

(57) ABSTRACT

A tape attachment apparatus includes a tape supply unit configured to provide a tape to be attached to a tip of an electrode roll, a tape attachment unit configured to attach the tape provided by the tape supply unit to the electrode roll, and a frame configured to allow the tape attachment unit to be mounted to the frame. A tape attachment process to prevent unwinding of the electrode roll is automatically performed.

10 Claims, 8 Drawing Sheets

(51) Int. Cl.
  *H01M 4/04* (2006.01)
  *H01M 10/04* (2006.01)

(52) U.S. Cl.
  CPC .............. *H01M 10/0409* (2013.01); *B65H 2301/414422* (2013.01); *B65H 2301/414433* (2013.01); *B65H 2553/80* (2013.01); *B65H 2701/19* (2013.01); *B65H 2701/377* (2013.01)

(58) Field of Classification Search
  CPC ............ B65H 2553/80; B65H 2701/19; B65H 2701/377; H01M 4/04; H01M 4/0409
  See application file for complete search history.

(56) References Cited

FOREIGN PATENT DOCUMENTS

| | | | |
|---|---|---|---|
| JP | S59118649 | A | 7/1984 |
| JP | H01166662 | U | 11/1989 |
| JP | H05186111 | A | 7/1993 |
| JP | H06-87178 | A | 3/1994 |
| JP | H08295441 | A | 11/1996 |
| JP | 2783517 | B2 | 8/1998 |
| JP | 2971264 | B2 | 11/1999 |
| JP | 2001167757 | A | 6/2001 |
| JP | 2001206623 | A | 7/2001 |
| JP | 3315407 | B2 | 8/2002 |
| JP | 2002255414 | A | 9/2002 |
| JP | 3745874 | B2 | 2/2006 |
| JP | 2006139974 | A | 6/2006 |
| JP | 2008162781 | A | 7/2008 |
| JP | 2009051659 | A | 3/2009 |
| KR | 20000003167 | U | 2/2000 |
| KR | 101344508 | B1 | 12/2013 |
| KR | 20140088742 | A | 7/2014 |
| KR | 20180025542 | A | 3/2018 |
| KR | 20180062374 | A | 6/2018 |
| KR | 20190087723 | A | 7/2019 |
| KR | 20200066018 | A | 6/2020 |
| WO | 9314013 | A2 | 7/1993 |
| WO | 02102694 | A1 | 12/2002 |
| WO | 2019-049240 | A1 | 3/2019 |

OTHER PUBLICATIONS

Extended European Search Report including Written Opinion for Application No. 21843023.9 dated Nov. 3, 2023, pp. 1-8.

TAPE ATTACHMENT APPARATUS

CROSS-REFERENCE TO RELATED APPLICATIONS

The present application is a national phase entry under 35 U.S.C. § 371 of International Application No. PCT/KR2021/008604 filed on Jul. 6, 2021, and now published as International Publication No. WO 2022/014940 A1, which claims priority from Korean Patent Application No. 2020-0087018 filed on Jul. 14, 2020, all of which are hereby incorporated herein by reference in their entireties.

FIELD

The present invention relates to a tape attachment apparatus, and more particularly to an apparatus capable of automatically attaching a tape attached to an electrode roll without a worker in order to prevent unwinding of the electrode roll.

BACKGROUND

A lithium secondary battery, which is capable of being charged and discharged, is appropriately used as a built-in battery cell, since it is unnecessary to replace a battery cell, and functional improvement, such as stability improvement and capacity increase, has been rapidly achieved. Accordingly, kinds of devices to which the lithium secondary battery is applied have gradually increased.

For example, the lithium secondary battery has been used as an energy source for wireless mobile devices, which are small multifunctional products, or wearable devices, which are worn on bodies, and has also been used as an energy source for electric vehicles and hybrid electric vehicles presented as alternatives to existing gasoline and diesel vehicles, which cause air pollution.

An electrode assembly of the lithium secondary battery is classified depending on the structure of an electrode assembly including a positive electrode, a separator, and a negative electrode. Typically, the electrode assembly includes a stacked type electrode assembly, which is configured to have a structure in which one or more positive electrode plates and one or more negative electrode plates are stacked in the state in which a separator is interposed therebetween, a stacked and folded type electrode assembly, which is configured to have a structure in which stacked type unit cells, each of which includes a positive electrode plate and a negative electrode plate, are wound using a separation sheet, a laminated and stacked type electrode assembly, which is configured to have a structure in which stacked type unit cells, each of which includes a positive electrode plate and a negative electrode plate, are stacked in the state in which a separator is interposed therebetween, and a jelly-roll type electrode assembly, which is configured to have a structure in which a positive electrode sheet and a negative electrode sheet are wound in the state in which a separator is interposed therebetween.

A process of manufacturing an electrode including the positive electrode and the negative electrode includes a step of coating the remaining part of an electrode sheet wound in the form of a roll, excluding a part at which an electrode tab is to be formed, with an electrode agent, a step of drying and rolling the electrode agent, a step of slitting the electrode sheet, and a step of notching the slit electrode sheet into unit electrodes.

In order to prevent unwinding of the electrode roll during manufacture of the electrode, the electrode roll is stored and transported in the state in which a tape is attached to a start portion or an end portion of the electrode roll. In addition, the tape must be removed such that the electrode roll, to which the tape is attached, is unwound so as to be used in an electrode manufacturing process. A worker is needed in order to attach and remove the tape. However, the state in which the tape is attached and removed may not be uniform depending on skill of the worker, which may delay the electrode manufacturing process.

In connection therewith, Patent Document 1 discloses a tape attachment apparatus that attaches a tape to each of the front surface and the rear surface of an electrode sheet. In the tape attachment apparatus according to the Patent Document 1, a tape is suctioned into suction holes by suction force of an adhesive head, whereby irregularities are formed at the surface of the tape, and air bubbles are generated between the electrode sheet and the tape by the irregularities, which causes occurrence of defective products in a battery manufacturing process.

In order to solve the above problem, Patent Document 1 discloses a tape attachment apparatus and method for attaching a tape to a portion at which electrode sheets are connected to each other in the state in which the electrode sheets are disposed side by side, but neither discloses nor teaches a method of attaching a tape to an electrode roll having an electrode sheet wound therearound in order to prevent unwinding of the electrode roll.

Therefore, there is a high necessity for an apparatus capable of attaching a tape to an electrode roll in order to prevent unwinding of the electrode roll, wherein the apparatus is applicable to the electrode roll irrespective of the size of the electrode roll and is capable of automatically attaching the tape to the electrode roll without a worker.

PRIOR ART DOCUMENT (Patent Document 1) Japanese Patent Application Publication No. 2001-167757 (2001 Jun. 22)

SUMMARY OF THE DISCLOSURE

The present invention has been made in view of the above problems, and it is an object of the present invention to provide a tape attachment apparatus capable of automatically attaching a tape to a winding tip of an electrode roll in order to prevent unwinding of the electrode roll and uniformly maintaining the attachment position of the tape and the size of the tape, thereby improving productivity of an electrode manufacturing process.

In order to accomplish the above object, a tape attachment apparatus according to the present invention is configured to have a structure including a tape supply unit configured to provide a tape to be attached to a tip of an electrode roll, a tape attachment unit configured to attach the tape provided by the tape supply unit to the electrode roll, and a frame configured to allow the tape attachment unit to be mounted thereto.

In the tape attachment apparatus according to the present invention, the tape supply unit may include an unwinding roll configured to withdraw a tape sheet configured to have a structure in which a tape body is attached to a tape substrate and a rewinding roll configured to rewind the tape substrate from which the tape body is separated.

In the tape attachment apparatus according to the present invention, the tape attachment unit may include a mounting portion configured to mount the tape attachment unit to the frame, an attachment portion configured to suction the tape supplied by the tape supply unit and to attach the tape to the electrode roll, and a transfer portion configured to transfer the attachment portion from the tape supply unit to the electrode roll.

In the tape attachment apparatus according to the present invention, the tape body may be configured to have a structure including an adhesive portion and a non-adhesive portion.

In the tape attachment apparatus according to the present invention, the attachment portion may include an upper end portion configured to be rotated about a rotary shaft, an extension portion connected to the upper end portion, the length of the extension portion being adjustable, and a suction portion configured to suction the tape.

In the tape attachment apparatus according to the present invention, the suction portion may be configured to have a structure in which the surface of the suction portion to which the tape is attached is deformable from a flat surface to a curved surface.

In the tape attachment apparatus according to the present invention, a sensor configured to sense the tip of the electrode roll may be mounted to the frame.

In the tape attachment apparatus according to the present invention, a rotary roll having the electrode roll mounted thereto may rotate the electrode roll such that the sensor senses the tip of the electrode roll.

In the tape attachment apparatus according to the present invention, the frame may include a structure capable of moving in a direction toward the electrode roll.

In the tape attachment apparatus according to the present invention, the frame may include a touch roll configured to increase adhesive force of the tape attached to the electrode roll.

Also, in the tape attachment apparatus according to the present invention, when the touch roll comes into contact with a surface of the electrode roll, the electrode roll having the tape attached thereto may be rotated in a state of abutting the touch roll.

As is apparent from the above description, a tape attachment apparatus according to the present invention is capable of automatically performing a tape attachment process in order to prevent unwinding of an electrode roll in a wound state in an electrode manufacturing process, whereby it is possible to rapidly attach a tape to the surface of the electrode roll and to provide an electrode roll having tapes of the same size attached to predetermined positions thereof.

Also, in a tape sheet configured to have a structure in which a tape body is attached to a tape substrate, the tape body is separated from the tape substrate and is attached to the electrode roll, whereby a separate process of cutting the tape is unnecessary, and a tape constituted by a tape body having a predetermined size may be attached to the electrode roll.

In addition, an attachment portion of a tape attachment unit is configured to have a structure in which the attachment portion is deformed into a curved surface so as to come into tight contact with the outer surface of the electrode roll, which is a curved surface, whereby the tape attachment apparatus according to the present invention is applicable to electrode rolls of various sizes.

DETAILED DESCRIPTION

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but rather means that such elements may be further included unless mentioned otherwise.

In addition, limitations set forth in dependent claims may be applied to all embodiments described in this specification.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Embodiments of the present invention will be described in detail with reference to the accompanying drawings.

Figure 1:
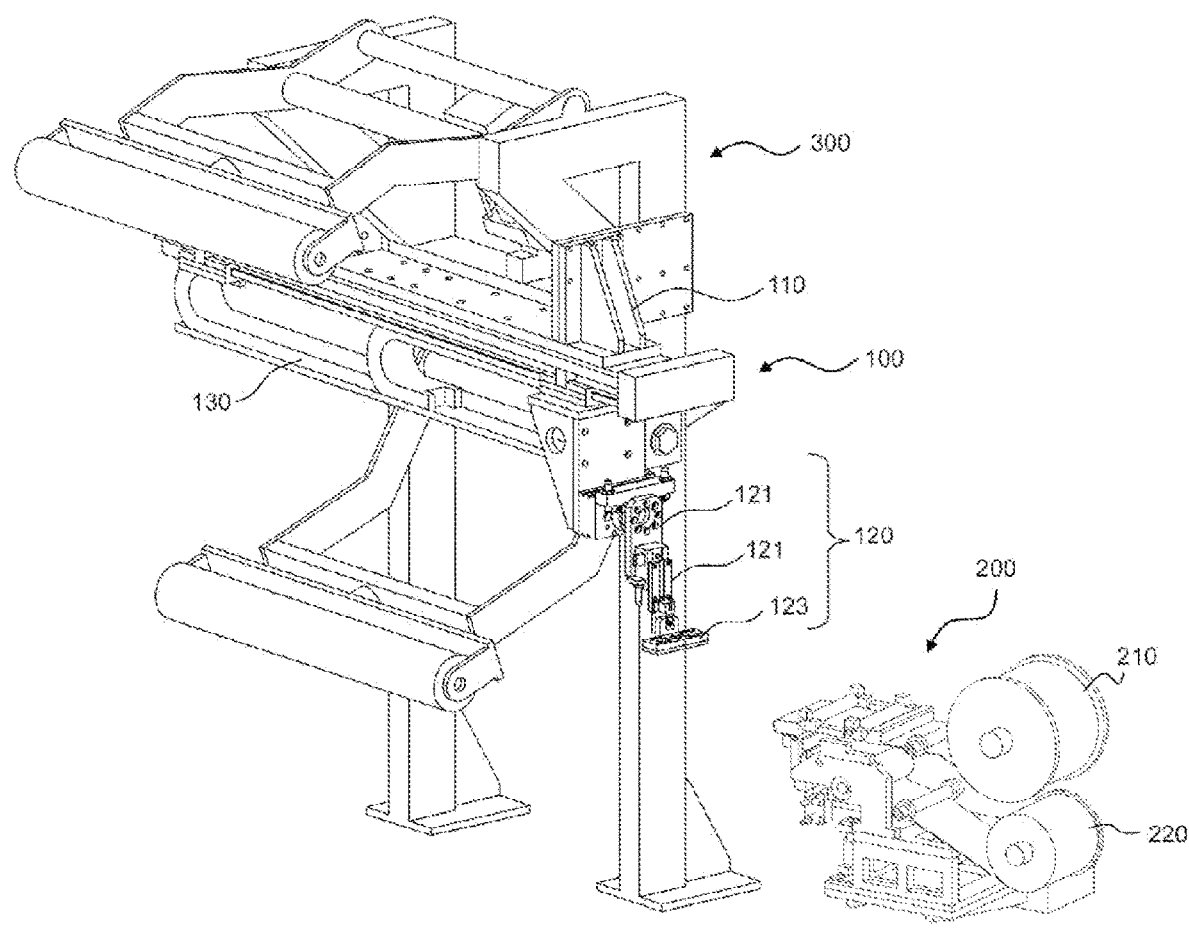
FIG. 1 is a perspective view of a tape attachment apparatus according to an embodiment.
Figure 2:
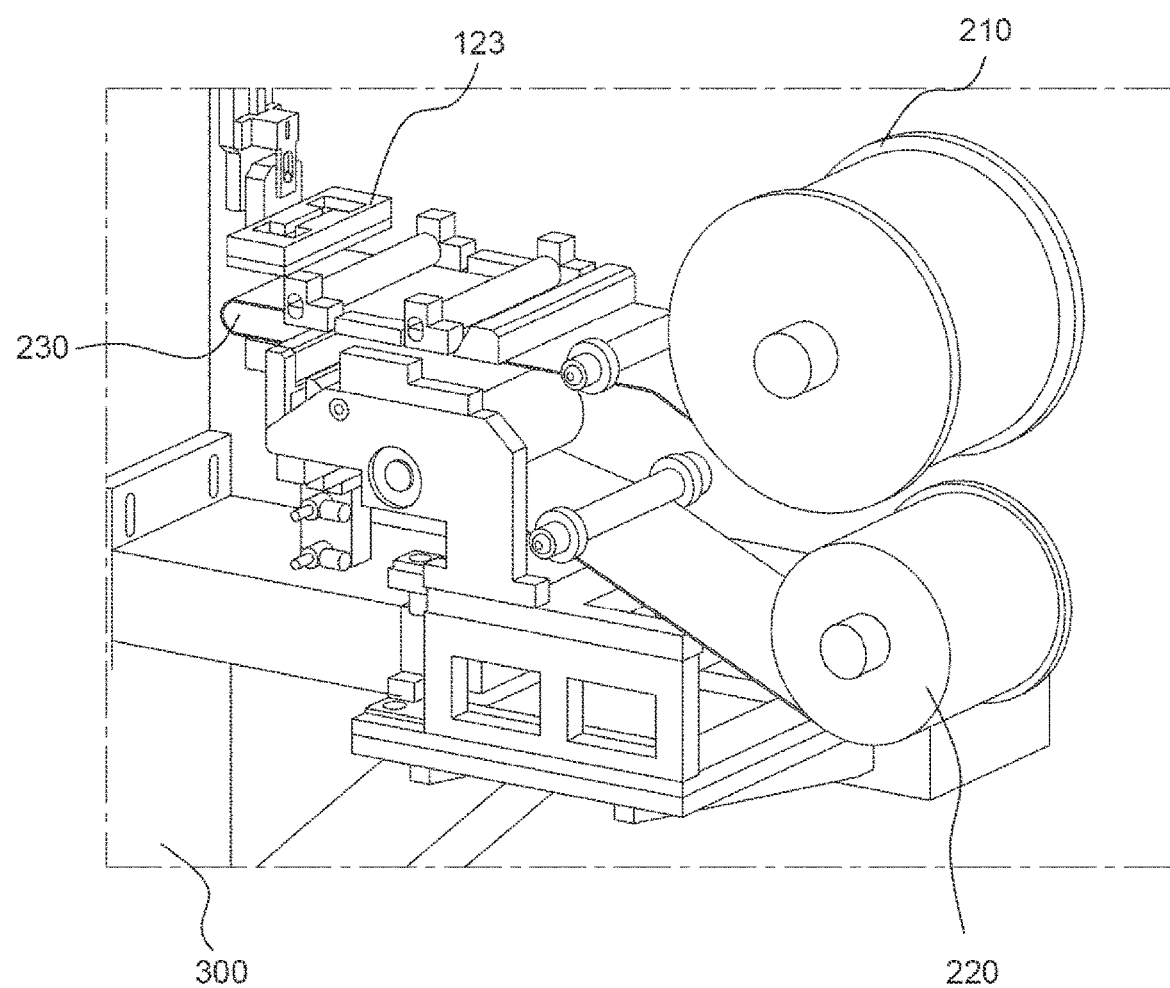
FIG. 2 is a partial enlarged perspective view of a tape supply unit of the tape attachment apparatus of FIG. 1 showing a state in which the tape supply unit is mounted to a frame of the tape attachment apparatus of FIG. 1.

FIG. 1 is a perspective view of a tape attachment apparatus according to an embodiment, and FIG. 2 is a partial enlarged perspective view showing the state in which a tape supply unit is mounted to a frame.

Referring to FIGS. 1 and 2, the tape attachment apparatus includes a tape supply unit 200 configured to provide a tape to be attached to a tip of an electrode roll, a tape attachment unit 100 configured to attach the tape provided by the tape supply unit 200 to the electrode roll, and a frame 300, to which the tape attachment unit is mounted.

The tape attachment unit 100 is configured to be detachably mounted to the frame 300. The configuration of the frame capable of constituting the tape attachment apparatus is not limited to the configuration of the frame shown in FIG. 1 as long as the tape attachment unit 100 can be coupled to the frame.

The tape supply unit 200 includes an unwinding roll 210 configured to withdraw a tape sheet configured to have a structure in which a tape body is attached to a tape substrate and a rewinding roll 220 configured to rewind the tape substrate from which the tape body is separated.

The tape supply unit 200 may be disposed independent of the frame, as shown in FIG. 1, or may be configured to have a structure in which the tape supply unit is mounted to the frame so as to be movable together with the frame, as shown in FIG. 2.

In this specification, "tape" means a portion that is separated from the tape sheet and is attached to the outer surface of the electrode roll, i.e. the tape body left as the result of the tape substrate being removed from the tape sheet. In the following description, "tape" and "tape body" have the same meaning.

The tape sheet is mounted to the unwinding roll 210 of the tape supply unit, and the unwinding roll 210 withdraws the tape sheet configured such that the tape body is attached to one surface of the tape substrate. In the tape sheet transferred to a separation table 230, the tape body is suctioned by a suction portion 123 of an attachment portion 120 of the tape attachment unit, whereby the tape body is separated from the tape substrate.

Figure 3:
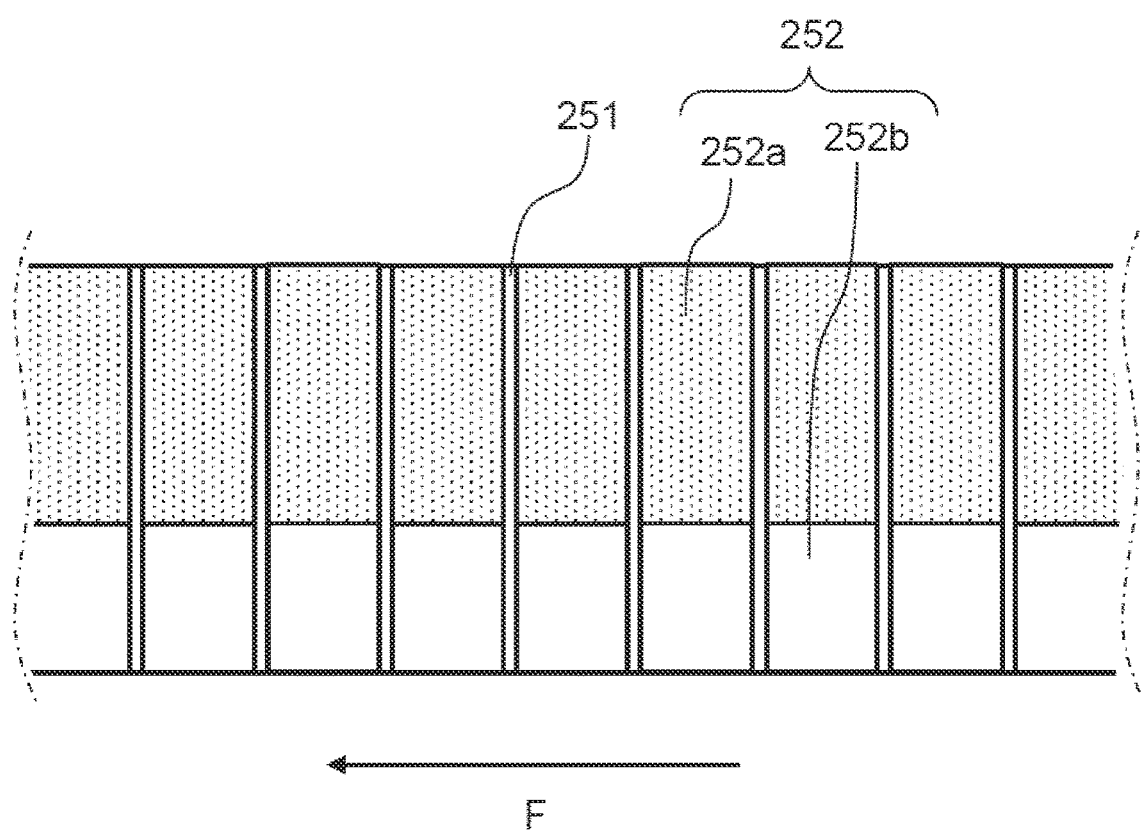
FIG. 3 is a partial plan view of a tape withdrawn from a tape sheet.

In connection therewith, FIG. 3 is a partial plan view of the tape withdrawn from the tape sheet.

Referring to FIG. 3, the state in which the tape sheet is withdrawn in a withdrawal direction F of the tape sheet is shown. The tape bodies 252 are attached to one surface of the tape substrate 251 so as to be spaced apart from each other by a predetermined distance. In the tape sheet transferred to the separation table 230, therefore, the tape bodies 252 are separated from the tape substrate 251 one by one by suctioning force of the suction portion 123.

The tape body 252 is configured to have a structure including an adhesive portion 252a and a non-adhesive portion 252b. When the suction portion 123 suctions the tape body 252, therefore, the non-adhesive portion 252b, which has no adhesive force, may be separated first from the tape substrate and may be attached to the surface of the suction portion 123.

Figure 4:
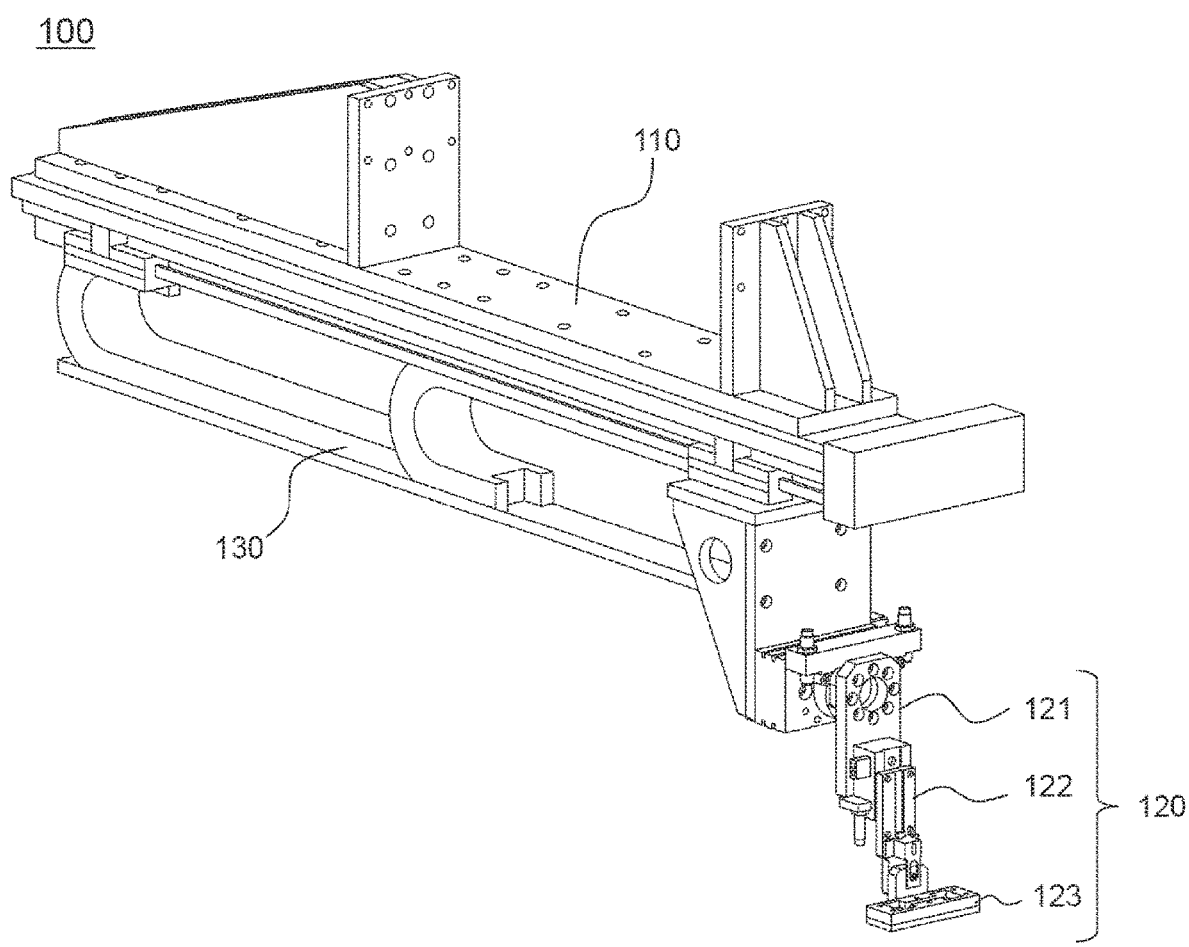
FIG. 4 is a perspective view of a tape attachment unit of the tape attachment apparatus of FIG. 1.
Figure 5:
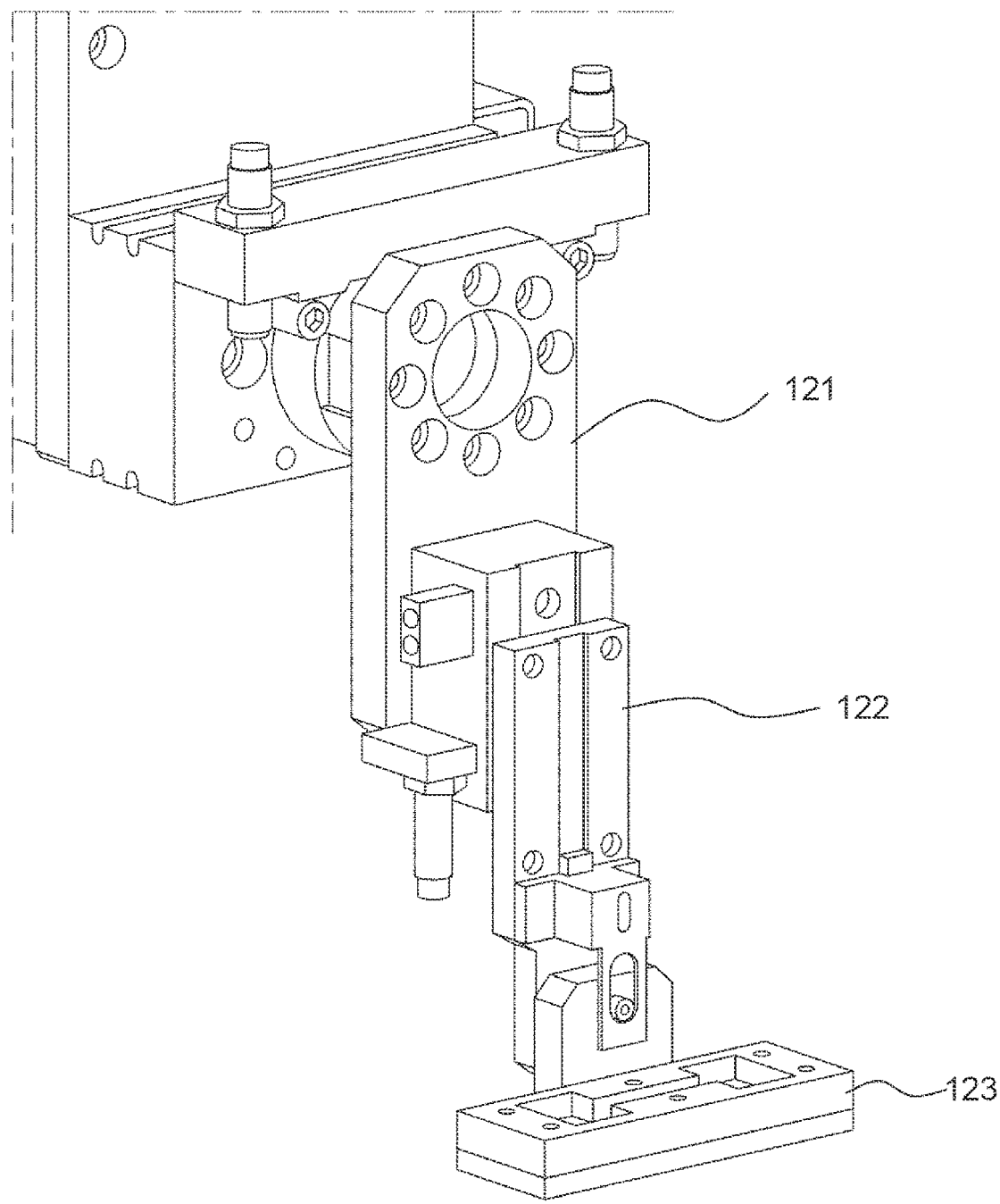
FIG. 5 is an enlarged view of an attachment portion of the tape attachment unit of FIG. 4.

FIG. 4 is a perspective view of the tape attachment unit, and FIG. 5 is an enlarged view of an attachment portion of FIG. 4.

Referring to FIGS. 4 and 5, the tape attachment unit 100 includes a mounting portion, which is a portion configured to mount the tape attachment unit to the frame, an attachment portion 120 configured to suction the tape supplied by the tape supply unit and to attach the tape to the electrode roll, and a transfer portion 130 configured to transfer the attachment portion 120 from the tape supply unit to the electrode roll.

The mounting portion 110 is provided with a plurality of holes for screw fastening. The tape attachment unit may be mounted to the frame by screw fastening using bolts and nuts.

The attachment portion 120 includes an upper end portion configured to be rotated about a rotary shaft, an extension portion 122 connected to the upper end portion 121, the length of the extension portion being adjustable, and a suction portion 123 configured to suction the tape.

The suction portion 123 may be configured to have a structure in which the surface of the suction portion to which the tape is attached is deformable from a flat surface to a curved surface.

Figure 6:
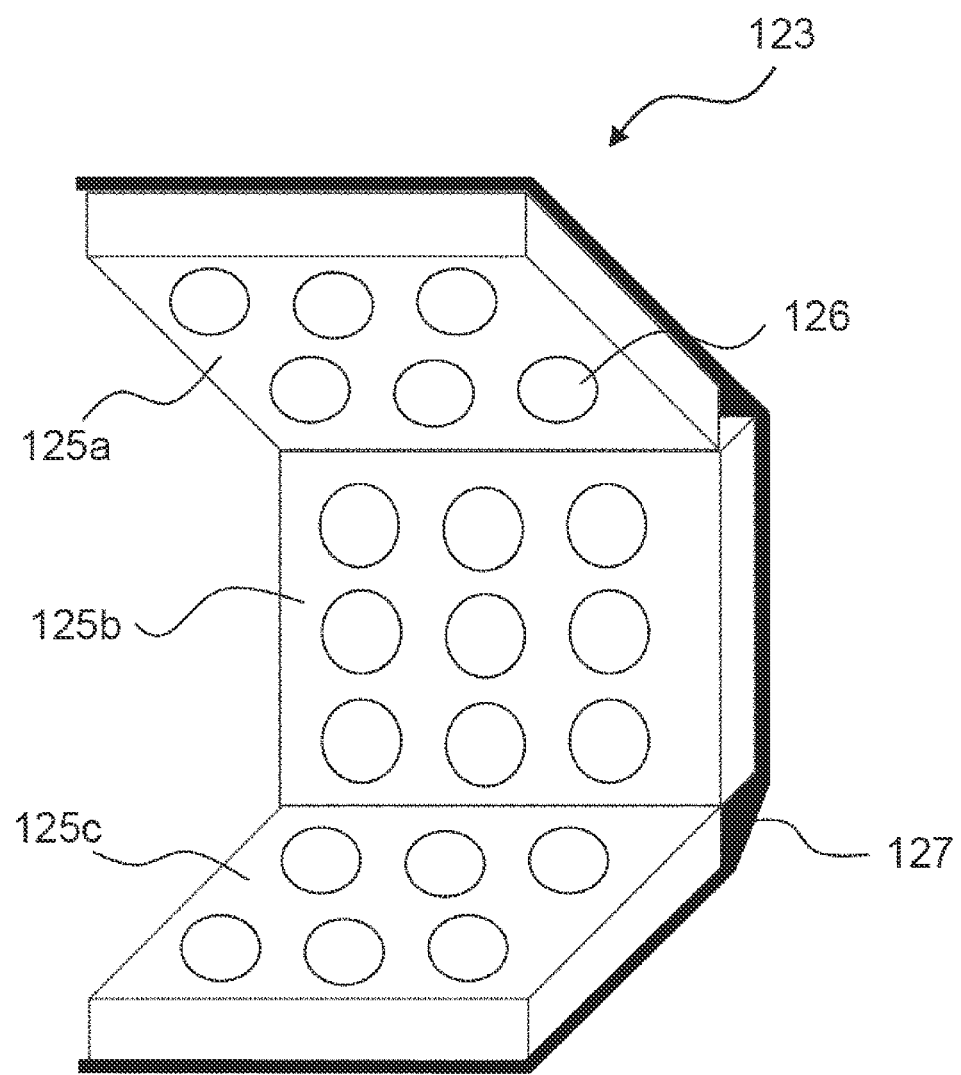
FIG. 6 is a perspective view showing the bottom surface of a suction portion of the tape attachment apparatus of FIG. 4.

In connection therewith, FIG. 6 is a perspective view showing the bottom surface of the suction portion.

Referring to FIG. 6, the suction portion is constituted by three partitioned parts, i.e. a first part 125a, a second part 125b, and a third part 125c. The first part 125a, the second part 125b, and the third part 125c, which are surfaces to which the tape is attached, are provided with a plurality of suction holes 126 in order to suction the tape by vacuum decompression.

A base portion 127 may be disposed at the rear surfaces of the first part 125a, the second part 125b, and the third part 125c in order to fix and connect the parts to each other.

In order to increase force of tight contact between the electrode roll and the tape attached to the outer surface of the electrode roll, it is preferable for the bottom surface of the suction portion 123 to be deformable into a curved shape such that the suction portion 123 comes into tight contact with the outer surface of the electrode roll.

In the case in which the diameter of the electrode roll is small, the radius of curvature of the electrode roll is decreased. In the case in which the diameter of the electrode roll is large, the radius of curvature of the electrode roll is increased. In the case in which the bottom of the suction portion is deformable such that the radius of curvature thereof is increased or decreased, therefore, it is possible to attach the tape to the outer surface of each of electrode rolls having various different outer diameters with high tight contact force.

As in the suction portion shown in FIG. 6, therefore, angles between the first part 125a, the second part 125b, and the third part 125c are changeable, and therefore it is possible to secure attachment force of the tape with respect to electrode rolls of various sizes.

Figure 7:
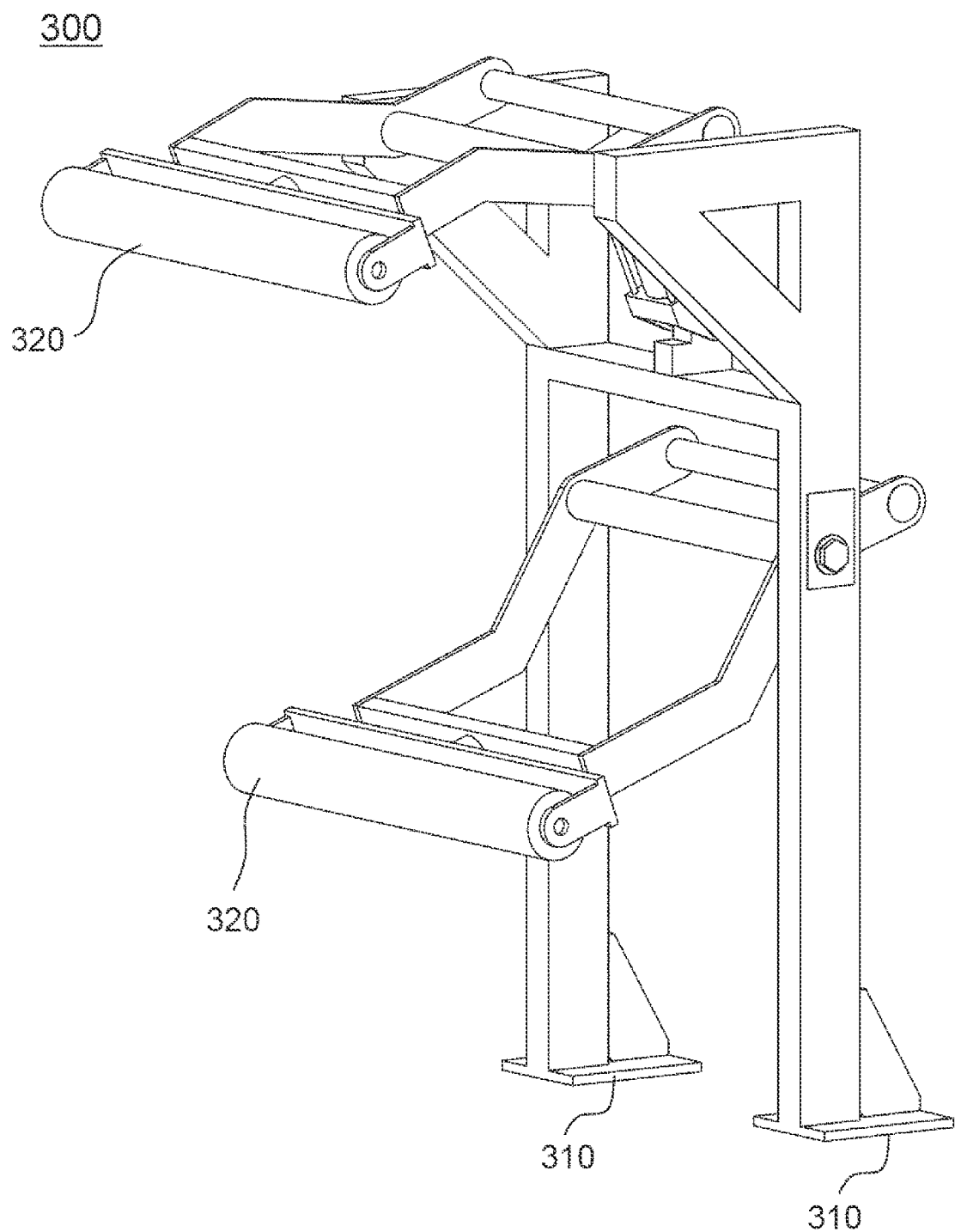
FIG. 7 is a perspective view of the frame of the tape attachment apparatus of FIG. 1.

FIG. 7 is a perspective view of the frame of the tape attachment apparatus of FIG. 1.

Referring to FIG. 7, the frame 300 includes a touch roll 320 configured to increase adhesive force of the tape attached to the electrode roll.

In addition, the frame 300 may include a structure capable of moving in a direction toward the electrode roll in order to attach the tape to the electrode roll.

Although omitted from the frame 300 of FIG. 1, for example, wheels may be attached to a frame support portion 310 such that the frame 300 is movable, or the frame 300 may be disposed on a rail such that the frame 300 is movable in a forward-rearward direction.

In a concrete example, when describing a process in which the tape attachment apparatus according to the present invention attaches the tape to the outer surface of the electrode roll, first, the transfer portion of the tape attachment unit mounted to the frame transfers the attachment portion to the tape supply unit, and the suction portion of the attachment portion suctions the tape supplied by the tape supply unit.

Figure 8:
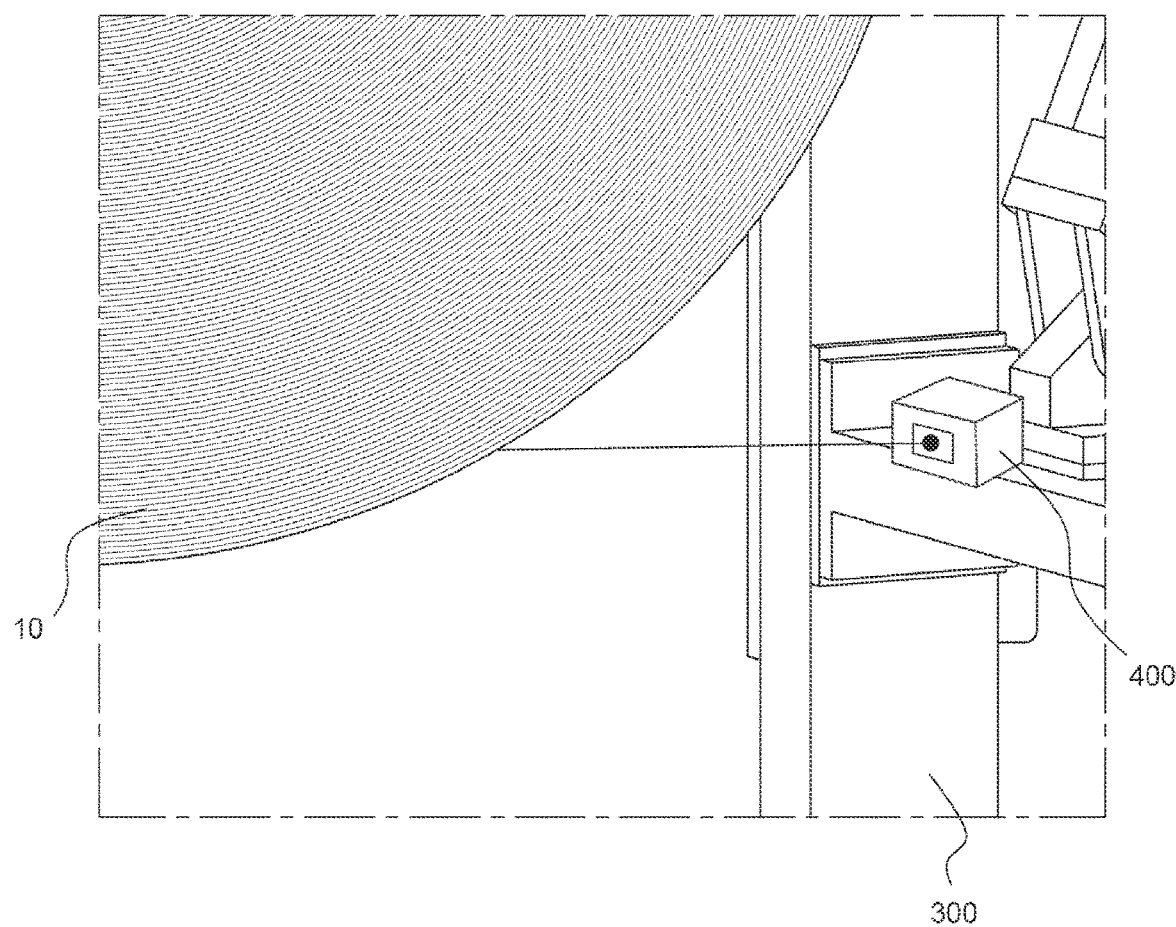
FIG. 8 is a partial enlarged view of the frame having a sensor mounted thereto.

A subsequent process after the tape is suctioned by the attachment portion will be described. FIG. 8 is a partial enlarged view of the frame having a sensor mounted thereto.

Referring to FIG. 8, a sensor 400 configured to sense the tip of the electrode roll is mounted to the frame 300. A rotary roll, to which the electrode roll 10 is mounted, rotates the electrode roll 10 such that the sensor 400 senses the tip of the electrode roll.

When the sensor 400 senses the tip of the electrode roll 10, rotation of the rotary roll is stopped, and the frame 300, to which the tape attachment unit having the taped suctioned thereby is mounted, moves toward the electrode roll 10.

At this time, the transfer portion transfers the attachment portion from the tape supply unit in a direction toward the electrode roll, and the length of the extension portion of the attachment portion is increased such that the suction portion comes into contact with the outer surface of the electrode roll in order to attach the tape to the tip of the electrode roll.

The above process may be repeatedly performed as many times as the number of tapes attached to the electrode roll. Alternatively, in the state in which the tape supply unit is mounted to the frame, tape suction, transfer, and attachment processes by the tape attachment unit may be repeatedly performed without movement of the frame at the position at which the first tape is attached.

When a process of attaching a single tape or a plurality of tapes to the tip of the electrode roll is completed, the touch roll moves toward the electrode roll such that the touch roll comes into contact with the electrode roll. The electrode roll having the tape attached thereto is rotated in a state of abutting the touch roll in order to increase attachment force of the tape.

When the tape attachment apparatus according to the present invention is used, as described above, it is possible to automatically attach the tape to the electrode roll without intervention of a worker, whereby it is possible to equalize attachment quality of the tape attached to the electrode roll.

Those skilled in the art to which the present invention pertains will appreciate that various applications and modifications are possible within the category of the present invention based on the above description.

DESCRIPTION OF REFERENCE SYMBOLS

10: Electrode roll
100: Tape attachment unit
110: Mounting portion
120: Attachment portion
121: Upper end portion
122: Extension portion
123: Suction portion
125a: First part
125b: Second part
125c: Third part
126: Suction hole
127: Based portion
130: Transfer portion
200: Tape supply unit
210: Unwinding roll
220: Rewinding roll
230: Separation table
251: Tape substrate
252: Tape body
252a: Adhesive portion
252b: Non-adhesive portion
300: Frame
310: Frame support portion
320: Touch roll
400: Sensor
F: Withdrawal direction of tape sheet As is apparent from the above description, a tape attachment apparatus according to the present invention is capable of automatically performing a tape attachment process in order to prevent unwinding of an electrode roll in a wound state in an electrode manufacturing process, whereby it is possible to rapidly attach a tape to the surface of the electrode roll and to provide an electrode roll having tapes of the same size attached to predetermined positions thereof.

Also, in a tape sheet configured to have a structure in which a tape body is attached to a tape substrate, the tape body is separated from the tape substrate and is attached to the electrode roll, whereby a separate process of cutting the tape is unnecessary, and a tape constituted by a tape body having a predetermined size may be attached to the electrode roll.

In addition, an attachment portion of a tape attachment unit is configured to have a structure in which the attachment portion is deformed into a curved surface so as to come into tight contact with the outer surface of the electrode roll, which is a curved surface, whereby the tape attachment apparatus according to the present invention is applicable to electrode rolls of various sizes.

The invention claimed is:

1. A tape attachment apparatus comprising:
a tape supply unit configured to provide a tape;
a tape attachment unit configured to attach the tape provided by the tape supply unit to an electrode roll, the tape attachment unit having a tape attachment portion configured to suction the tape supplied by the tape supply unit and to attach the tape to the electrode roll; and
a frame configured to mount the tape attachment unit,
wherein the tape attachment portion comprises an upper end portion configured to be rotated about a rotary shaft, an extension portion connected to the upper end portion and having an adjustable length, and a suction portion connected to the extension portion and configured to suction the tape, and
wherein the suction portion includes a suction surface to which the tape is attached when the tape is suctioned by the suction portion that is deformable from a flat surface to a curved surface.

2. The tape attachment apparatus according to claim 1, wherein the tape supply unit comprises:
an unwinding roll configured to withdraw a tape sheet comprising the tape, the tape sheet including a tape substrate and a tape body of the tape attached to the tape substrate; and
a rewinding roll configured to rewind the tape substrate from which the tape body is separated.

3. The tape attachment apparatus according to claim 2, wherein the tape body comprises an adhesive portion and a non-adhesive portion.

4. The tape attachment apparatus according to claim 1, wherein the tape attachment unit comprises:
a mounting portion configured to mount the tape attachment unit to the frame; and
a transfer portion configured to transfer the tape attachment portion from the tape supply unit to the electrode roll.

5. The tape attachment apparatus according to claim 1, further comprising a sensor configured to sense a tip of the electrode roll is mounted to the frame.

6. The tape attachment apparatus according to claim 5, further comprising a rotary roll to which the electrode roll is mounted, wherein the rotary roll rotates the electrode roll such that the sensor senses the tip of the electrode roll.

7. The tape attachment apparatus according to claim 1, wherein the frame is configured for moving in a direction toward the electrode roll.

8. The tape attachment apparatus according to claim 1, wherein the frame comprises a touch roll configured to increase adhesive force of the tape attached to the electrode roll.

9. The tape attachment apparatus according to claim 8, wherein, when the touch roll contacts a surface of the electrode roll, the electrode roll to which the tape is attached is rotated to abut the touch roll.

10. The tape attachment apparatus according to claim 1, wherein the tape attachment unit is configured to attach the tape provided by the tape supply unit to a tip of the electrode roll.

\* \* \* \* \*